US010110950B2

(12) United States Patent
Abou Mahmoud et al.

(10) Patent No.: US 10,110,950 B2
(45) Date of Patent: Oct. 23, 2018

(54) ATTENTIVENESS-BASED VIDEO PRESENTATION MANAGEMENT

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/265,839

(22) Filed: Sep. 14, 2016

(65) Prior Publication Data

US 2018/0077455 A1    Mar. 15, 2018

(51) Int. Cl.
| | |
|---|---|
| *H04N 7/025* | (2006.01) |
| *H04N 21/442* | (2011.01) |
| *H04L 29/08* | (2006.01) |
| *H04N 21/258* | (2011.01) |
| *H04N 21/45* | (2011.01) |
| *H04N 21/61* | (2011.01) |
| *H04N 21/81* | (2011.01) |
| *H04L 12/58* | (2006.01) |

(52) U.S. Cl.
CPC ....... *H04N 21/44213* (2013.01); *H04L 67/22* (2013.01); *H04N 21/25891* (2013.01); *H04N 21/4532* (2013.01); *H04N 21/6125* (2013.01); *H04N 21/812* (2013.01); *H04L 51/32* (2013.01); *H04L 67/34* (2013.01)

(58) Field of Classification Search
CPC ....... H04N 21/44218; H04N 21/44222; H04N 21/466; H04N 21/667
See application file for complete search history.

(56) References Cited

U.S. PATENT DOCUMENTS

| 4,661,847 | A | 4/1987 | Weinblatt |
| 6,327,418 | B1 * | 12/2001 | Barton ............... H04N 21/4331 |
| | | | 348/E5.007 |
| 6,587,155 | B1 | 7/2003 | Xue |
| 7,231,651 | B2 | 6/2007 | Pong |

(Continued)

FOREIGN PATENT DOCUMENTS

| CA | 2539777 A1 | 4/2005 |
| WO | 2010029472 A1 | 3/2010 |

OTHER PUBLICATIONS

She et al.; "Convergence of Interactive Displays with Smart Mobile Devices for Effective Advertising: A Survey"; ACM, 2014.

(Continued)

*Primary Examiner* — Pankaj Kumar
*Assistant Examiner* — Timothy R Newlin
(74) *Attorney, Agent, or Firm* — Erik K. Johnson

(57) ABSTRACT

Disclosed aspects relate to attentiveness-based video presentation management. Using a set of computer-based sensors, an attentiveness of a user related to a first set of video presentation contents is monitored. Based on the monitoring, an attentiveness factor of the user related to the first set of video presentation contents is detected. Based on the attentiveness factor of the user related to the first set of video presentation contents, a second set of video presentation contents for presentation to the user is determined. The second set of video presentation contents is presented to the user.

20 Claims, 5 Drawing Sheets

(56) References Cited

U.S. PATENT DOCUMENTS

| | | |
|---|---|---|
| 8,417,566 B2 | 4/2013 | Price et al. |
| 8,537,201 B2 | 9/2013 | Choi et al. |
| 8,875,167 B2 | 10/2014 | Stiers et al. |
| 8,937,591 B2 | 1/2015 | Julian |
| 9,189,805 B2 | 11/2015 | Huang et al. |
| 9,525,912 B1* | 12/2016 | Israelian ......... H04N 21/44218 |
| 9,697,295 B1* | 7/2017 | Nijim ................ G06F 17/30876 |
| 2003/0093784 A1* | 5/2003 | Dimitrova ............. H04N 7/163 |
| | | 725/10 |
| 2003/0110507 A1* | 6/2003 | Dimitrova ............. G06Q 30/02 |
| | | 725/110 |
| 2003/0123850 A1* | 7/2003 | Jun .................. G06F 17/30796 |
| | | 386/343 |
| 2004/0221322 A1* | 11/2004 | Shen ................ G06F 17/30796 |
| | | 725/135 |
| 2005/0078873 A1 | 4/2005 | Cetin et al. |
| 2006/0047701 A1* | 3/2006 | Maybury ......... G06F 17/30828 |
| 2006/0103736 A1* | 5/2006 | Obrador .................... G06T 1/20 |
| | | 348/222.1 |
| 2007/0107010 A1* | 5/2007 | Jolna ...................... G06Q 30/02 |
| | | 725/34 |
| 2007/0279494 A1* | 12/2007 | Aman ................... G01S 3/7864 |
| | | 348/169 |
| 2008/0077952 A1 | 3/2008 | St. Jean et al. |
| 2008/0216107 A1* | 9/2008 | Downey ............ H04N 7/17318 |
| | | 725/22 |
| 2008/0285800 A1* | 11/2008 | Miyake .................... H04N 5/44 |
| | | 382/103 |
| 2009/0172731 A1* | 7/2009 | Heilbron ................ G06Q 30/02 |
| | | 725/36 |
| 2009/0307048 A1 | 12/2009 | Grossman |
| 2010/0004977 A1* | 1/2010 | Marci ................... G06Q 10/10 |
| | | 705/7.32 |
| 2010/0088406 A1* | 4/2010 | Yu .......................... H04N 7/163 |
| | | 709/224 |
| 2012/0324494 A1* | 12/2012 | Burger .................... H04H 60/33 |
| | | 725/12 |
| 2013/0156407 A1* | 6/2013 | Seok ........................ H04N 5/76 |
| | | 386/343 |
| 2013/0243270 A1* | 9/2013 | Kamhi ............... G06K 9/00281 |
| | | 382/118 |
| 2014/0026156 A1* | 1/2014 | Deephanphongs ......................... H04N 21/25866 |
| | | 725/12 |
| 2014/0040931 A1* | 2/2014 | Gates, III ............ H04N 21/251 |
| | | 725/14 |
| 2014/0049695 A1* | 2/2014 | Papish ............. H04N 21/44204 |
| | | 348/731 |
| 2014/0078039 A1* | 3/2014 | Woods ............... H04N 21/4223 |
| | | 345/156 |
| 2014/0096152 A1 | 4/2014 | Ferens et al. |
| 2014/0161325 A1* | 6/2014 | Bergen ............... G06K 9/00617 |
| | | 382/117 |
| 2014/0176813 A1* | 6/2014 | Conness .................. H04N 5/60 |
| | | 348/738 |
| 2014/0278308 A1* | 9/2014 | Liu ......................... H04L 67/22 |
| | | 703/6 |
| 2014/0282646 A1* | 9/2014 | McCoy .............. G06K 9/00597 |
| | | 725/12 |
| 2014/0359647 A1* | 12/2014 | Shoemake ......... H04N 5/23206 |
| | | 725/10 |
| 2015/0036999 A1* | 2/2015 | Batur ...................... G06F 3/013 |
| | | 386/230 |
| 2015/0189339 A1* | 7/2015 | Sood .................. H04N 21/2401 |
| | | 725/32 |
| 2015/0189355 A1* | 7/2015 | Korbecki ........... H04N 21/4117 |
| | | 725/12 |
| 2015/0339539 A1* | 11/2015 | Gu ..................... G06K 9/00335 |
| | | 382/190 |
| 2015/0363837 A1 | 12/2015 | Lewis et al. |
| 2016/0088352 A1* | 3/2016 | Agarwal ............ H04N 21/4667 |
| | | 725/12 |
| 2016/0094880 A1* | 3/2016 | Ward ................ H04N 21/44218 |
| | | 725/12 |
| 2016/0150260 A1* | 5/2016 | Ovide ................ H04N 21/2668 |
| | | 725/12 |
| 2016/0316237 A1* | 10/2016 | Couleaud ........... H04N 21/4223 |
| 2016/0345060 A1* | 11/2016 | Marci ............. H04N 21/44218 |
| 2017/0085951 A1* | 3/2017 | Singh ............... H04N 21/42201 |
| 2017/0134776 A1* | 5/2017 | Ranjeet ................ H04N 21/252 |
| 2017/0164029 A1* | 6/2017 | Dey .................... H04N 21/2668 |

OTHER PUBLICATIONS

Mazo; "How to use Smart Stay on the Galaxy S3"; <http://www.androidcentral.com/howusesmartstaygalaxys3>; 2012.

* cited by examiner

ATTENTIVENESS-BASED VIDEO PRESENTATION MANAGEMENT

BACKGROUND

This disclosure relates generally to computer systems and, more particularly, relates to attentiveness-based video presentation management. Video presentation management may be desired to be performed as efficiently as possible. The amount of data that needs to be managed with respect to video presentation is increasing. As data needing to be managed increases, the need for management efficiency may increase.

SUMMARY

Aspects of the disclosure relate to attention span driven commercial presentation. Features described herein can monitor an attention span of a user by analyzing eye gaze activities of the user. Elements may present a complete commercial video or a set of key frames of the commercial video based on the attention span of the user. In addition, aspects may integrate the commercial video based on a current background environment/scene and a movement pattern of characters in the scene. The integration may include a portion/fraction of the overall presentation space based on the attentiveness factor of the user. To illustrate, if the attention of the user wanes, the volume may be increased and the size of the integrated video may be shrunk. Aspects described herein can positively impact productivity of a user by intelligently presenting portion(s) of or the full length of the commercial video while another video is or is to be presented. Accordingly, key messages may be strategically be delivered to the user.

Aspects of the disclosure relate to attentiveness-based video presentation management. Using a set of computer-based sensors, an attentiveness of a user related to a first set of video presentation contents is monitored. Based on the monitoring, an attentiveness factor of the user related to the first set of video presentation contents is detected. In embodiments, the attentiveness factor may relate to an eye gaze activity factor, an eye gaze focus factor, an eye gaze duration factor, a mouse focus factor, a typing speed factor, a number of open applications factor, a running application factor, a set of social media activity by the user, an external noise factor, or the like. Based on the attentiveness factor of the user related to the first set of video presentation contents, a second set of video presentation contents for presentation to the user is determined. The second set of video presentation contents is presented to the user.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
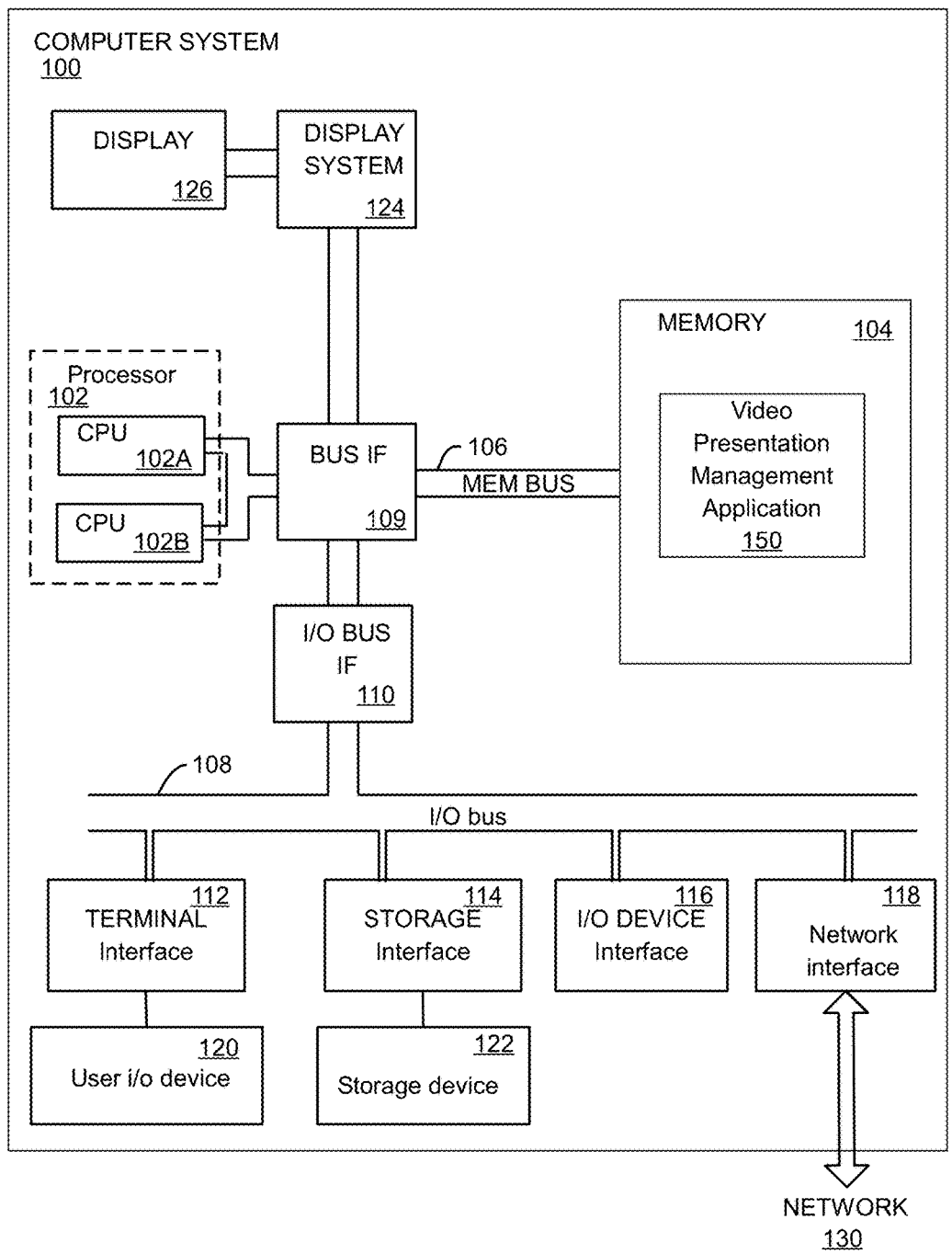
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to attention span driven commercial presentation. Features described herein can monitor an attention span of a user by analyzing eye gaze activities of the user. Elements may present a complete commercial video or a set of key frames of the commercial video based on the attention span of the user. In addition, aspects may integrate (e.g., blend, mix) the commercial video based on a current background environment/scene and a movement pattern of characters in the scene. The integration may include a portion/fraction of the overall presentation space (e.g., display screen) based on the attentiveness factor of the user. To illustrate, if the attention of the user wanes, the volume may be increased and the size of the integrated video may be shrunk. Aspects described herein can positively impact productivity of a user by intelligently presenting portion(s) of or the full length of the commercial video while another video is or is to be presented. Accordingly, key messages may be strategically be delivered to the user (e.g., a marketplace of users).

Advertisements (e.g., commercial videos) can appear immediately before a user needs/desires to browse and discover information. The user may not have the option to skip the video immediately (e.g., in order to focus on the content of the page or video). Further, if the user is not interested in the commercial at all, the user may be particularly annoyed (e.g., when the user has little free time). Aspects described herein may utilize various methodologies to monitor an attention span of the user. If it is identified that the user is looking away, elements can increase the volume of the video to draw the attention of the user back. If features determine that the eye focus of the user is not staying on the currently played video, then aspects described herein may play a set of key frames of the commercial video. If it is detected that the user is highly focused on the commercial video, then aspects described herein can play the full length of the commercial video. Disclosed aspects may utilize movement detection and estimation in wavelet compressed video to compare and determine whether the background scene has changed substantially or trivially during certain period of time (e.g. 10 seconds).

Accordingly, aspects described herein may detect the attention span at runtime based on the focus (e.g., eye gaze, mouse focus, typing speed) of the user on the content. Features may analyze a main content background scene or an advertisement scene related to movement frequency, main color in the background, main character in the background, the narrative, or the like. A set of key frames may be selected from the advertisement video that have the highest similarity between the main content background color and the background color of the advertisement. Similarly, a set of key frames can be chosen from the advertisement video that have a narrative that could be integrated into or otherwise fit into the main content. As such, an immersion environment may be present in a manner such that the user can receive the information in the advertisement video through an effective and enjoyable technique.

Aspects of the disclosure include a method, system, and computer program product for attentiveness-based video presentation management. Using a set of computer-based sensors, an attentiveness of a user related to a first set of video presentation contents is monitored. Based on the monitoring, an attentiveness factor of the user related to the first set of video presentation contents is detected. Based on the attentiveness factor of the user related to the first set of video presentation contents, a second set of video presentation contents (e.g., an advertisement video, a set of key frames of an advertisement video) for presentation to the user is determined. The second set of video presentation contents is presented to the user.

In embodiments, the attentiveness factor may relate to an eye gaze activity factor, an eye gaze focus factor, an eye gaze duration factor, a mouse focus factor, a typing speed factor, a number of open applications factor, a running application factor, a set of social media activity by the user, an external noise factor, or the like. In embodiments, with respect to the second set of video presentation contents for presentation to the user, a set of advertisement message data may be analyzed. Also, with respect to a third set of video presentation contents for presentation to the user a set of background environment data can be analyzed. Together, based on the analyzing of both the set of advertisement message data and the set of background environment data, a video content relationship for the second and third sets of video presentation contents may be determined.

In various embodiments, based on both the attentiveness factor and the video content relationship, a presentation integration action to integrate the second set of video presentation contents with the third set of video presentation contents can be determined. In certain embodiments, the second set of video presentation contents may be integrated with the third set of video presentation contents. In certain embodiments, based on the presentation integration action, a presentation to the user of the second set of video presentation contents integrated-with the third set of video presentation contents may be carried-out. Altogether, the attentiveness-based video presentation management may be associated with performance or efficiency benefits (e.g., data security, application stability, speed, flexibility, load balancing, responsiveness, resource usage, productivity). Aspects may save resources such as bandwidth, processing, or memory.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a video presentation management application 150. In embodiments, the video presentation management application 150 may include instructions or statements that execute on the processor 102 or instructions or statements that are interpreted by instructions or statements that execute on the processor 102 to carry out the functions as further described below. In certain embodiments, the video presentation management application 150 is implemented in hardware via semiconductor devices, chips, logical gates, circuits, circuit cards, and/or other physical hardware devices in lieu of, or in addition to, a processor-based system. In embodiments, the video presentation management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit.

In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
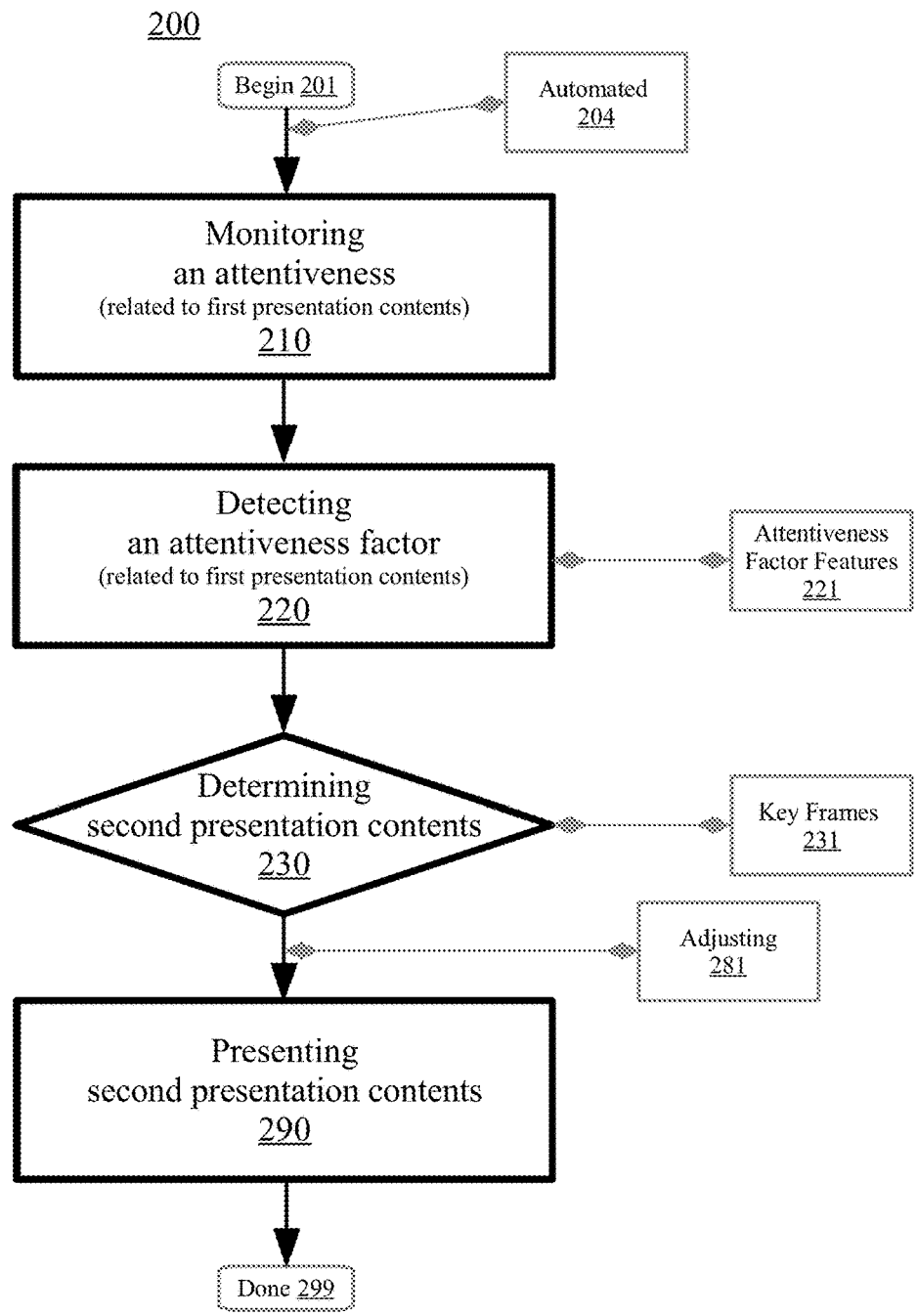
FIG. 2 is a flowchart illustrating a method for attentiveness-based presentation management according to embodiments.

FIG. 2 is a flowchart illustrating a method 200 for attentiveness-based presentation management according to embodiments. The method 200 may begin at block 201. In embodiments at block 204, the operational steps such as the monitoring, the detecting, the determining, and the presenting each occur in an automated fashion without user intervention or manual action (e.g., using automated computing machinery, fully machine-driven without manual stimuli). The automated operational steps may be performed by a management engine (e.g., as part of a social networking environment).

At block 210, an attentiveness of a user related to a first set of video presentation contents is monitored. The monitoring is performed using a set of computer-based sensors. The set of computer-based sensors may include various sensors related to light, motion, temperature, vibration, pressure, sound, biometrics, computer activity, or other physical aspects of an environment. The sensors may be internal or external to a computer. Monitoring can include observing (e.g., watching a reference point with respect to the user), searching (e.g., exploring for a feature with respect to the user), obtaining (e.g., recording a collection of data with respect to the user), probing (e.g., checking a property with respect to the user), scanning (e.g., reviewing a sample of characteristics with respect to the user), surveying (e.g., measuring a set of variables with respect to the user), or tracking (e.g., following a characteristic of the user). The user can include a computer, a virtual machine, an application, an individual utilizing a computer, or the like. The user may correspond with activities such as keystrokes, touch-screen touches/pushes, swipes, mouse-movement/clicks, eye-gazing, or the like. Such activities may indicate the attentiveness. Attentiveness may be characterized by attention, alertness, concentrations, consideration, diligence, heedfulness, a level of activity, or the like. The first set of video presentation contents can include a first main video, a first scene, a first background environment, or the like. For example, the first set of video presentation contents can include a full-length movie, a how-to video, a music video, a job/task training presentation, a deck of slides, a workout/exercise video, a television-type show, a streamed event, a sporting event, series of photographs, or the like.

At block 220, an attentiveness factor of the user related to the first set of video presentation contents is detected. The detection is based on the monitoring. Detecting can include receiving, sensing, discovering, acquiring, identifying, or the like. The attentiveness factor can relate to a set of attentiveness factor features at block 221. For instance, the attentiveness factor may be based on or be derived from an eye gaze activity factor. The eye gaze activity factor may quantitatively have a set of values for what an individual is looking at, how eyes move, or other visual behavior. Measurements of directions of eye movement or predictions of locations of objects that may be looked-at may occur. Such measurements may have various coordinates for spatial locations, or the like. Other possibilities for the attentiveness factor include a set of values of measurements/ratios related to an eye gaze focus factor (e.g., where/what/who/when is the user concentrated with respect to a component of the first set of video presentation contents), an eye gaze duration factor (e.g., how long does a stare last), a mouse focus factor (e.g., where is the mouse pointer located, what is the movement pattern for the mouse pointer or other like input device), a typing speed factor (e.g., how fast/slow a user is typing which may or may not relate to the content of the video), a number of open applications factor (e.g., programs opened by a user, applications being actively used by the user, various ratios of applications open), a running application factor (e.g. a quantity of running services, various rations of applications running whether opened by the user or not), a set of social media activity by the user (e.g., postings more related to the first set of video presentation contents may indicate highly engaged/attentive, postings less related to the first set of video presentation contents may indicate a lack of engagement/attentiveness), an external noise factor (e.g., indications of cooking such as pots and pans may indicate the user is doing tasks other than watching the video being displayed, various types of background music, children crying), or the like.

At block 230, a second set of video presentation contents for presentation to the user is determined. The determination is based on the attentiveness factor of the user related to the first set of video presentation contents. Determining can include ascertaining, identifying, resolving, evaluating, formulating, computing, calculating, comparing, or the like. The second set of video presentation contents may include one or more advertisements such as an advertisement video, commercials, public service announcements, weather event notifications, corporate training information, or the like. For instance, various weather forecasts may be available to be presented and the specific weather forecast can be selected based on a level/degree to which the user is tuned-in to the first set of video presentation contents (e.g., a highly engaged user may be presented with a traditional-type weather forecast without extraneous entertainment-oriented features, a lesser engaged user may be presented with a weather forecast set to music with rapidly changing color schemes). As another example, a highly attentive user may be presented with an advertisement for a specific model of a brand of an automobile while a lesser attentive user may merely be presented with an advertisement for the brand of the automobile (e.g., a more attentive user may be expected to retain more specific information).

In embodiments, the second set of video presentation contents may include a set of key frames of the advertisement video at block 231. For instance, a user who has more than a threshold number of applications open may have only a few key frames presented based on a likelihood that the user will minimize the window sooner than a user who has fewer than the threshold number of applications open when playing the first set of video presentation contents. In certain embodiments, a more attentive user may be presented with more key frames. In various embodiments, the number of key frames may be a percentage of the total number of frames which corresponds to a relative attentiveness of the user related to the first set of video presentation contents. Various possibilities are considered for determining the second set of video presentation contents based on the attentiveness factor of the user related to the first set of video presentation contents.

In various embodiments, one or more audio components of the second set of video presentation contents may be adjusted, changed, modified, or muted at block 281. The one or more audio components may be adjusted based on the attentiveness factor (e.g., derived from the eye gaze activity factor). For example, a greater volume configuration may be utilized when presenting to a user whose eye gaze activity factor indicates that the user is paying little or no attention to the first set of video presentation contents (e.g., to gain or regain the attention of the user for the advertisement). As another example, an element of music (e.g., bass) may be muted for a song that a user would notice that the element of music is missing in order to gain/regain the attention of the user. Various possibilities for adjusting one or more audio components are considered.

At block 290, the second set of video presentation contents is presented to the user. In certain embodiments, the presentation may occur in addition to or concurrent with presentation of the first set of video presentation contents. Presenting can include outputting, communicating, providing, transmitting, sending, broadcasting, playing, conveying, displaying, messaging, printing, publishing, or the like. For example, a management engine may play the second set of video presentation contents (e.g., a three-second automobile tire advertisement which has a plurality of key frames of a thirty-second automobile tire advertisement) while also outputting the first set of video presentation contents (e.g., a streaming version of a televised automobile race).

Method 200 concludes at block 299. Aspects of method 200 may provide performance or efficiency benefits with respect to attentiveness-based video presentation management. For example, aspects of method 200 may include positive impacts on user-satisfaction, flexibility, responsiveness, or productivity with respect to video presentation management. In embodiments, performance or efficiency benefits when presenting video presentation contents to a user may occur (e.g., speed, flexibility, load balancing, responsiveness, productivity).

Figure 3:
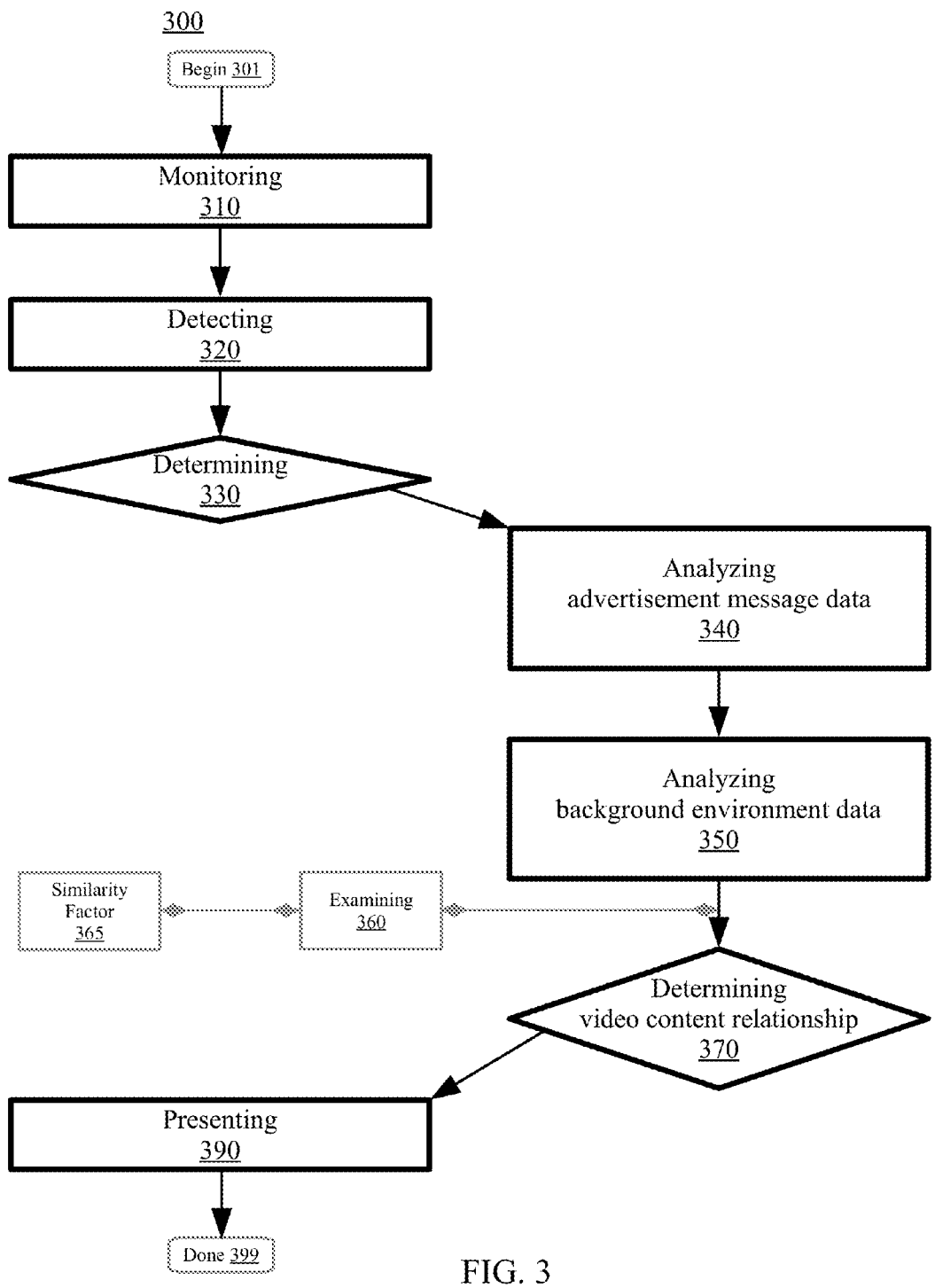
FIG. 3 is a flowchart illustrating a method for attentiveness-based presentation management according to embodiments.

FIG. 3 is a flowchart illustrating a method 300 for attentiveness-based presentation management according to embodiments. Aspects of method 300 may be similar or the same as aspects of method 200 and aspects may be utilized with other methodologies described herein (e.g., method 400, method 500). The method 300 may begin at block 301. At block 310, an attentiveness of a user related to a first set of video presentation contents is monitored. The monitoring is performed using a set of computer-based sensors. At block 320, an attentiveness factor of the user related to the first set of video presentation contents is detected. The detection is based on the monitoring. At block 330, a second set of video presentation contents for presentation to the user is determined. The determination is based on the attentiveness factor of the user related to the first set of video presentation contents.

Analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/ patterns from a data set and transform/translate it into an understandable structure (e.g., a data report which can be provided/furnished) for further use.

At block 340, a set of advertisement message data is analyzed. The analyzing may be performed with respect to the second set of video presentation contents for presentation to the user. To illustrate, the analysis may be related to substantive content attempted to be communicated to the user. For instance, the second set of video presentation contents may include various videos of people jumping while wearing the same brand of shoes. Accordingly, the set of advertisement message data may pertain to that brand of shoes facilitating a person to jump higher or to have positive wellness results with respect to landing impact on human joints. In particular, jumping higher may be parsed if a subtext from the advertisement includes a form of the word "jump" (e.g., the phrase "jump higher", a disclaimer which makes a statement related to jumping). Various possibilities for analyzing the set of advertisement message data are considered.

At block 350, a set of background environment data is analyzed. The analyzing may be performed with respect to a third set of video presentation contents for presentation to the user. The third set of video presentation contents may be similar to the first set of video presentation contents. For instance, the third set of video presentation contents may include a next main video in a series of main videos (e.g., a series of media clips). As another example, the third set of video presentation contents may include a next scene of a movie (e.g., in a sequence of scenes which make-up the movie). The set of background environment data can pertain to various colors, patterns, movements, images, videos, audio, still images, indoor/outdoor, objects, characters, or the like. For instance, the set of background environment data may include a gentle snowfall with stringed-lights. As another example, the set of background environment data may include a busy city at night with moving headlights from vehicles and the sound of horns/sirens in the city. Various possibilities for analyzing the set of background environment data are considered.

In embodiments, a set of scene busyness factors is examined at block 360. The examination may relate to a movement frequency (e.g., a rate of change of motion of an object/character/etc.), a set of colors (e.g., a pattern), a set of characters (e.g., one or more people/animations), or a narrative (e.g., a theme, a storyline, a main idea, a subject matter). Examining can include inspecting, extracting, scanning, evaluating, analyzing, dissecting, resolving, categorizing, or the like. The examination may be with respect to the set of background environment data, with respect to the set of advertisement message data, or the like. A scene busyness factor may include a scaled score (e.g., from 0 to 100) of how much movement, a nature of colors, or the like. The score may be determined relative to a benchmark for like video presentation contents (e.g., the benchmark may be different for a sporting event versus a debate).

At block 370, a video content relationship for the second and third sets of video presentation contents is determined. The determination may be made based on the analyzing of both the set of advertisement message data and the set of background environment data. The video content relationship may indicate aspects such as movement frequency, a set of colors, a set of characters, or a narrative. As such, the video content relationship may include a comparison of scene busyness factors for the second and third sets of video presentation contents. As such, two sets of video presentation contents which are both busy relative to one or more thresholds may have a low relationship (e.g., challenging to integrate/blend/mix, expected to be distracting to present/view). Similarly, two sets of video presentation contents which are both not busy relative to one or more thresholds may have a high relationship (e.g., smoother to integrate/blend/mix, relatively comprehensible for presentation/view). Various relationships between may also be considered (e.g., a next main scene has many characters with a complex narrative and an advertisement has a simple text-based message). Accordingly, in embodiments, the video content relationship may be based on a similarity factor of the set of scene busyness factors for the second and third sets of video presentation contents at block 365. As such, even if the video content relationship indicates multiple complex features, when the multiple complex features are similar the video content relationship may indicate an opportunity to integrate (e.g., similar background color schemes which are complex may allow for integration as well or better than one complex and one simple color scheme). Various possibilities for the video content relationship are considered.

At block 390, the second set of video presentation contents is presented to the user. Method 300 concludes at block 399. Aspects of method 300 may provide performance or efficiency benefits with respect to attentiveness-based video presentation management. For example, aspects of method 300 may include positive impacts on user-satisfaction, flexibility, responsiveness, or productivity with respect to video presentation management. In embodiments, performance or efficiency benefits when presenting video presentation contents to a user may occur (e.g., speed, flexibility, load balancing, responsiveness, productivity).

Figure 4:
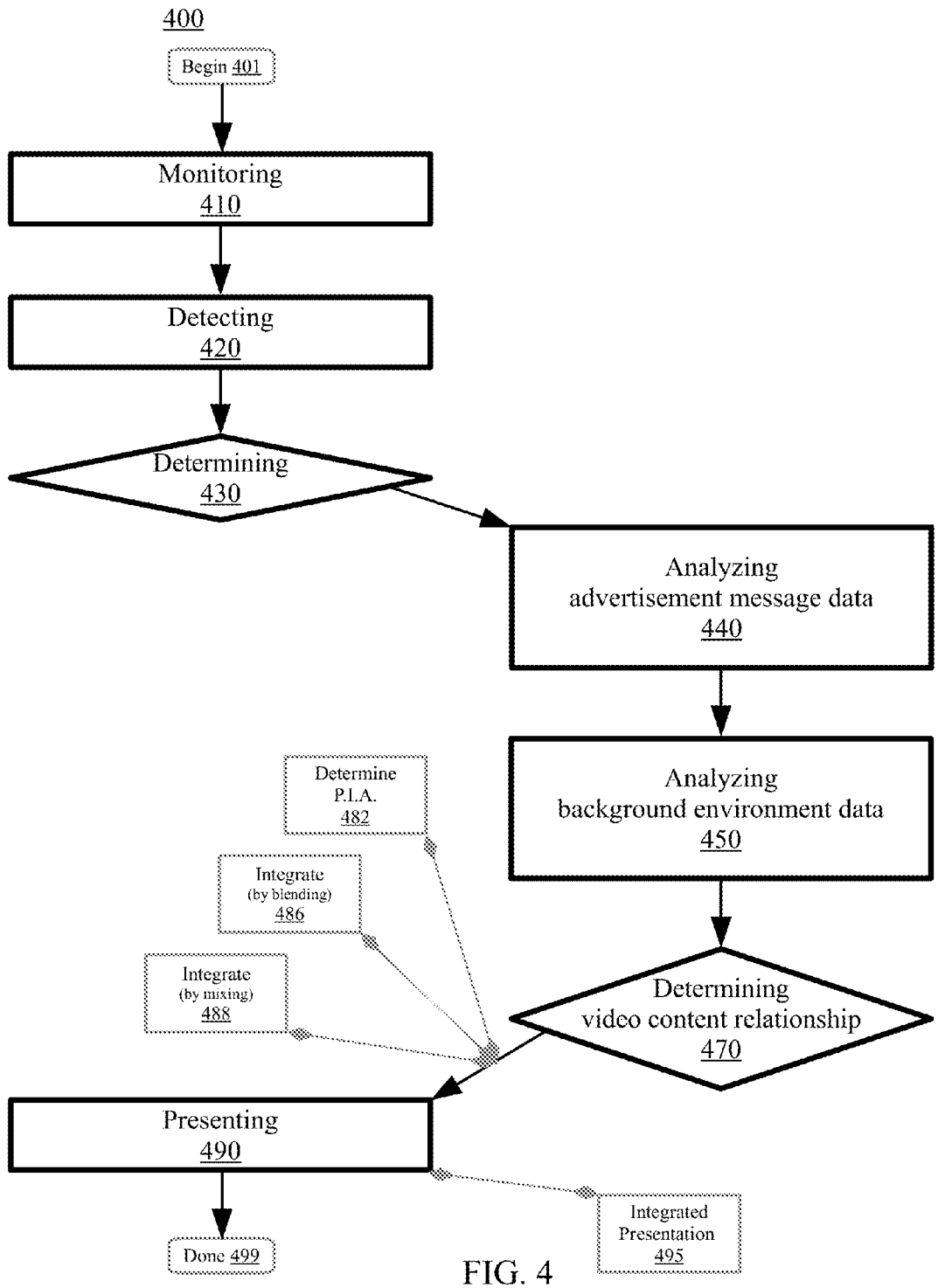
FIG. 4 is a flowchart illustrating a method for attentiveness-based presentation management according to embodiments.

FIG. 4 is a flowchart illustrating a method 400 for attentiveness-based presentation management according to embodiments. Aspects of method 400 may be similar or the same as aspects of method 200 and aspects may be utilized with other methodologies described herein (e.g., method 300, method 500). The method 400 may begin at block 401. At block 410, an attentiveness of a user related to a first set of video presentation contents is monitored. The monitoring is performed using a set of computer-based sensors. At block 420, an attentiveness factor of the user related to the first set of video presentation contents is detected. The detection is based on the monitoring. At block 430, a second set of video presentation contents for presentation to the user is determined. The determination is based on the attentiveness factor of the user related to the first set of video presentation contents. At block 440, a set of advertisement message data is analyzed. The analyzing may be performed with respect to the second set of video presentation contents for presentation to the user. At block 450, a set of background environment data is analyzed. The analyzing may be performed with respect to a third set of video presentation contents for presentation to the user. At block 470, a video content relationship for the second and third sets of video presentation contents is determined. The determination may be made based on the analyzing of both the set of advertisement message data and the set of background environment data.

In embodiments, a presentation integration action (e.g., blend video, change audio volume) is determined at block 482. The presentation action may be determined based on both the attentiveness factor and the video content relationship. The presentation action may integrate the second set of video presentation contents with the third set of video presentation contents. For example, when a user is typing at a speed above a threshold and the advertisement message data has a soft tone while the background environment data has a low volume, the presentation action may elevate the volume for an integrated video (of the second set of video presentation contents with the third set of video presentation contents). Various combinations and permutations of attentiveness factors and video content relationships are considered (e.g., eye gaze duration with comparative movement frequency, running applications with multiple complex narratives).

Integrating can include combining, assimilating, synthesizing, unifying, or the like. In embodiments, the second set of video presentation contents is integrated with the third set of video presentation contents at block 486. The integration may include blending one or more images of the second set of video presentation contents with one or more images of the third set of video presentation contents. For example, an insurance advertisement having a frog may be blended with a pond having pontoon boats for an outdoors television show (e.g., for a small truck automobile insurance advertisement aimed at fishermen). In embodiments, the second set of video presentation contents is integrated with the third set of video presentation contents at block 488. The integration may include mixing one or more audio components of the second set of video presentation contents with one or more audio components of the third set of video presentation contents. For instance, a message from a pilot and a sound of an airplane taking-off in a movie may be mixed with a familiar sequence of musical tones to remind the user of a particular airline (e.g., the sequence of musical tones that the airline company uses in its television commercials).

At block 490, the second set of video presentation contents is presented to the user. In embodiments, the second set of video presentation contents is presented to the user based on the presentation integration action in a manner such that the second set of video presentation contents is integrated-with the third set of video presentation contents at block 495. For example, two video may be played in a manner such that it appears they are one video. In certain embodiments, a picture-in-picture technique may be utilized to play both videos. In various embodiments, aspects of the videos may appear to be the same (e.g., an advertisement for snowmobiles set on top of an animated princess movie taking set in a northern country in the northern hemisphere). In various embodiments, sound elements may be integrated such that the conversation or narrative is coherent and accurately portrays all sets of video presentation contents as intended.

Method 400 concludes at block 499. Aspects of method 400 may provide performance or efficiency benefits with respect to attentiveness-based video presentation management. For example, aspects of method 400 may include positive impacts on user-satisfaction, flexibility, responsiveness, or productivity with respect to video presentation management. In embodiments, performance or efficiency benefits when presenting video presentation contents to a user may occur (e.g., speed, flexibility, load balancing, responsiveness, productivity).

Figure 5:
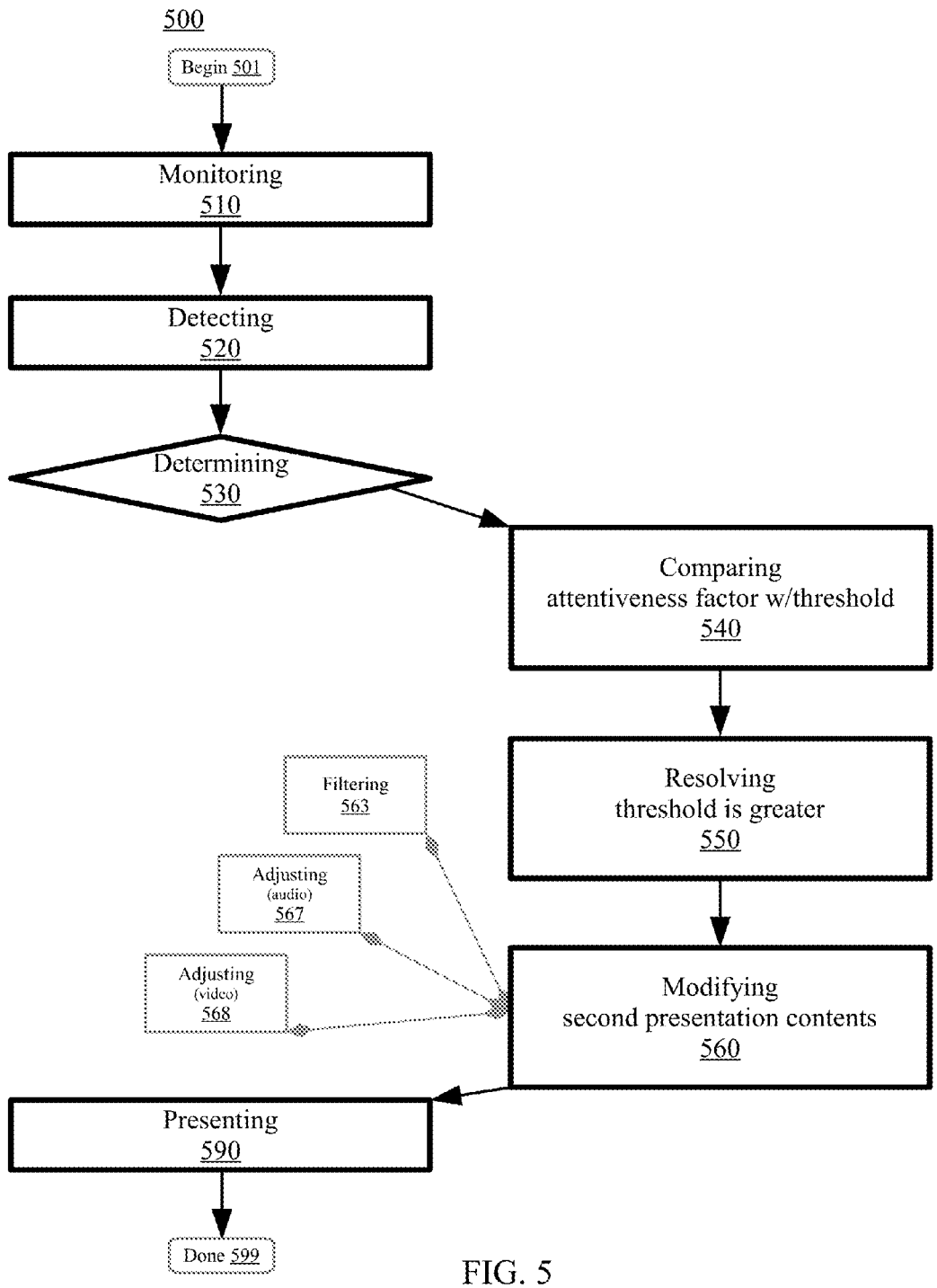
FIG. 5 is a flowchart illustrating a method for attentiveness-based presentation management according to embodiments.

FIG. 5 is a flowchart illustrating a method 500 for attentiveness-based presentation management according to embodiments. Aspects of method 500 may be similar or the same as aspects of method 200 and aspects may be utilized with other methodologies described herein (e.g., method 300, method 400). The method 500 may begin at block 501. At block 510, an attentiveness of a user related to a first set of video presentation contents is monitored. The monitoring is performed using a set of computer-based sensors. At block 520, an attentiveness factor of the user related to the first set of video presentation contents is detected. The detection is based on the monitoring. At block 530, a second set of video presentation contents for presentation to the user is determined. The determination is based on the attentiveness factor of the user related to the first set of video presentation contents.

In embodiments, the attentiveness factor of the user related to the first set of video presentation contents is compared with a threshold attentiveness factor at block 540. Comparing can include evaluating, appraising, assessing, or the like. The threshold attentiveness factor may include a benchmark attentiveness factor as a composite for one or more types of attentiveness or for a single type of attentiveness. The threshold attentiveness factor can include a numerical value which may be an arithmetic mean, median, quartile, or the like. For example, a typing speed at a given time may be compared with an average typing speed for the particular user. Similarly, eye gaze activities may be appraised with respect to median eye gaze activities when historical users have had the first set of video presentation contents presented to them. Various possibilities are considered.

In embodiments, it may be resolved that the threshold attentiveness factor exceeds the attentiveness factor of the user related to the first set of video presentation contents at block 550. Resolving can include computing, calculating, ascertaining, formulating, or the like. For example, the user may be posting on social media at a higher rate (and hence a lesser attentiveness factor) than normal (e.g., posting ten times per hour rather than twice per day). As another example, the mouse pointer of a user may be constantly on a card game window rather than the corporate training video window when measured by total percentage of the time the corporate training video window is open. As such, the calculation may be made that an attention span of a user is below a norm (e.g., for the user, for an average user).

In embodiments, the second set of video presentation contents is modified at block 560. The modification(s) may be made using a set of advertisement message data. Modifying can include changing, altering, adjusting, or the like. For instance, a set of key frames may be chosen instead of an entire full-length advertisement. The message may be shifted to a scrolling marquee at the bottom of a video instead of having a full voice-over (e.g., if it appears the user may have audio muted). The screen size of the second set of video presentation contents may be enlarged in an attempt to gain the attention of the user. Key frames may be chosen that are similar to the window the user is paying attention to (e.g., a set of card game frames). Various possibilities for such modifications are considered. In various embodiments, the modifying occurs in a dynamic fashion (e.g., in real-time, on-the-fly, in an ongoing basis) to streamline attentiveness-based video presentation management.

In certain embodiments, modifying the second set of video presentation contents can include filtering the second set of video presentation contents to include a set of key frames of an advertisement video (e.g., showing only a five second clip instead of a thirty second clip) at block 563. In certain embodiments, modifying the second set of video presentation contents includes adjusting one or more audio components of the second set of video presentation contents at block 567 (e.g., volume, tone, equalizer, bass), or adjusting one or more image components of the second set of video presentation contents at block 568 (e.g., brightness, contrast, color).

At block 590, the second set of video presentation contents is presented to the user. Method 500 concludes at block 599. Aspects of method 500 may provide performance or efficiency benefits with respect to attentiveness-based video presentation management. For example, aspects of method 500 may include positive impacts on user-satisfaction, flexibility, responsiveness, or productivity with respect to video presentation management. In embodiments, performance or efficiency benefits when presenting video presentation contents to a user may occur (e.g., speed, flexibility, load balancing, responsiveness, productivity).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for attentiveness-based video presentation management, the method comprising:

monitoring, using a set of computer-based sensors, an attentiveness of a user related to a first set of video presentation contents;

detecting, based on the monitoring, an attentiveness factor of the user related to the first set of video presentation contents;

determining, based on the attentiveness factor of the user related to the first set of video presentation contents, a second set of video presentation contents for presentation to the user, wherein the second set of video presentation contents is an advertisement comprising audio and visual content; and presenting, to the user, the second set of video presentation contents concurrently with the first set of video presentation contents, wherein concurrent presentation comprises playing the second set of video presentation contents within a presentation of the first set of video presentation contents, and wherein concurrent presentation comprises integrating aspects of the second set of video presentation contents to appear as part of the first set of video presentation contents, wherein integrating aspects comprises blending the audio of the second set of video presentation contents with the first set of video presentation contents based on a volume of an audio of the first set of video presentation contents and the attentiveness factor.

2. The method of claim 1, wherein the attentiveness factor is based on an eye gaze activity factor.

3. The method of claim 1, wherein the attentiveness factor is selected from the group consisting of:
an eye gaze focus factor;
an eye gaze duration factor;
a mouse focus factor;
a typing speed factor;
a number of open applications factor;
a running application factor;
a set of social media activity by the user; and
an external noise factor.

4. The method of claim 1, wherein the second set of video presentation contents includes a set of key frames of an advertisement video.

5. The method of claim 1, further comprising:
analyzing, with respect to the second set of video presentation contents for presentation to the user, a set of advertisement message data;
analyzing, with respect to a third set of video presentation contents for presentation to the user, a set of background environment data; and
determining, based on the analyzing of both the set of advertisement message data and the set of background environment data, a video content relationship for the second and third sets of video presentation contents.

6. The method of claim 5, further comprising:
examining a set of scene busyness factors related to a movement frequency, a set of colors, a set of characters, and a narrative.

7. The method of claim 6, wherein the video content relationship is based on a similarity factor of the set of scene busyness factors for the second and third sets of video presentation contents.

8. The method of claim 5, further comprising:
determining, based on both the attentiveness factor and the video content relationship, a presentation integration action to integrate the second set of video presentation contents with the third set of video presentation contents.

9. The method of claim 5, further comprising:
integrating, by blending one or more images of the second set of video presentation contents with one or more images of the third set of video presentation contents, the second set of video presentation contents with the third set of video presentation contents.

10. The method of claim 5, further comprising:
integrating, by mixing one or more audio components of the second set of video presentation contents with one or more audio components of the third set of video presentation contents, the second set of video presentation contents with the third set of video presentation contents.

11. The method of claim 8, wherein presenting, to the user, the second set of video presentation contents includes:
presenting, to the user based on the presentation integration action, the second set of video presentation contents integrated-with the third set of video presentation contents.

12. The method of claim 1, further comprising:
comparing the attentiveness factor of the user related to the first set of video presentation contents with a threshold attentiveness factor;
resolving that the threshold attentiveness factor exceeds the attentiveness factor of the user related to the first set of video presentation contents; and
modifying, using a set of advertisement message data, the second set of video presentation contents.

13. The method of claim 12, wherein modifying the second set of video presentation contents includes:
filtering the second set of video presentation contents to include a set of key frames of an advertisement video.

14. The method of claim 12, wherein modifying the second set of video presentation contents includes:
adjusting one or more audio components of the second set of video presentation contents; and
adjusting one or more image components of the second set of video presentation contents.

15. The method of claim 12, wherein the modifying occurs in a dynamic fashion to streamline attentiveness-based video presentation management.

16. The method of claim 2, further comprising:
adjusting, based on the eye gaze activity factor, one or more audio components of the second set of video presentation contents.

17. The method of claim 1, wherein the monitoring, the detecting, the determining, and the presenting each occur in an automated fashion without user intervention.

18. A system for attentiveness-based video presentation management, the system comprising:
a memory having a set of computer readable computer instructions;
a processor for executing the set of computer readable instructions, the set of computer readable instructions including:
monitoring, using a set of computer-based sensors, an attentiveness of a user related to a first set of video presentation contents;
detecting, based on the monitoring, an attentiveness factor of the user related to the first set of video presentation contents;
determining, based on the attentiveness factor of the user related to the first set of video presentation contents, a second set of video presentation contents for presentation to the user, wherein the second set of video presentation contents is an advertisement comprising audio and visual content; and
presenting, to the user, the second set of video presentation contents concurrently with the first set of video presentation contents, wherein concurrent presentation comprises playing the second set of video presentation contents within a presentation of the first set of video presentation contents, and wherein concurrent presentation comprises integrating aspects of the second set of video presentation contents to appear as part of the first set of video presentation contents, wherein integrating aspects comprises blending the audio of the second set of video presentation contents with the first set of video presentation contents based on a volume of an audio of the first set of video presentation contents and the attentiveness factor.

19. A computer program product for attentiveness-based video presentation management, the computer program product comprising a computer readable storage medium having program instructions embodied therewith, wherein the computer readable storage medium is not a transitory signal per se, the program instructions executable by a processor to cause the processor to perform a method comprising:

- monitoring, using a set of computer-based sensors, an attentiveness of a user related to a first set of video presentation contents;
- detecting, based on the monitoring, an attentiveness factor of the user related to the first set of video presentation contents;
- determining, based on the attentiveness factor of the user related to the first set of video presentation contents, a second set of video presentation contents for presentation to the user, wherein the second set of video presentation contents is an advertisement comprising audio and visual content; and
- presenting, to the user, the second set of video presentation contents concurrently with the first set of video presentation contents, wherein concurrent presentation comprises playing the second set of video presentation contents within a presentation of the first set of video presentation contents, and wherein concurrent presentation comprises integrating aspects of the second set of video presentation contents to appear as part of the first set of video presentation contents, wherein integrating aspects comprises blending the audio of the second set of video presentation contents with the first set of video presentation contents based on a volume of an audio of the first set of video presentation contents and the attentiveness factor.

20. The computer program product of claim 19, wherein at least one of:

- the program instructions are stored in the computer readable storage medium in a data processing system, and wherein the program instructions were downloaded over a network from a remote data processing system; or
- the program instructions are stored in the computer readable storage medium in a server data processing system, and wherein the program instructions are downloaded over a network to the remote data processing system for use in a second computer readable storage medium with the remote data processing system.

* * * * *